United States Patent

Arroubi et al.

[11] Patent Number: 5,071,077
[45] Date of Patent: Dec. 10, 1991

[54] ELECTRIC KITCHEN APPLIANCE WITH MULTIPLE FUNCTIONS FOR TREATING FOODSTUFFS

[76] Inventors: Mustapha Arroubi, 9 Rue Jean Baptiste LULLY, 74720 Monderville; Vital A. Parise, 7 Rue des Pivoines, F 74440 Douvres La Delivrande, both of France

[21] Appl. No.: 642,237

[22] Filed: Jan. 15, 1991

[30] Foreign Application Priority Data

Jan. 26, 1990 [FR] France .................. 90 00930

[51] Int. Cl.⁵ ............................. B02C 18/16
[52] U.S. Cl. ......................... 241/36; 241/92; 241/282.2; D7/384; D7/386; 366/142; 366/347
[58] Field of Search ............. 241/36, 92, 282.1, 282.2; D7/384, 368, 665, 386; 366/142, 347

[56] References Cited

U.S. PATENT DOCUMENTS 4,506,836 3/1985 Williams ..................... 241/282.1 X
4,629,131 12/1986 Podell ....................... 241/282.1 X
4,700,903 10/1987 Henn ......................... 241/282.2 X
4,741,482 5/1988 Goggiola et al. ............. 241/282.1 X Primary Examiner—Mark Rosenbaum
Assistant Examiner—Frances Chin
Attorney, Agent, or Firm—Young & Thompson

[57] ABSTRACT

An electric kitchen appliance with mulitiple functions for treating foodstuffs comprises a casing (1,1') of which a base (2, 2') is adapted to receive various accessories comprising a bowl (3) provided with a cover (4) and a tool (5, 6, 8), and an electrical control device for the current supply of the motor comprising a detector for the presence of the cover on the bowl and a speed changer for the motor. The electric control device of the motor comprises also a detector of the presence of the bowl on the base, as well as structure for the identification of the covers which are associated with the detector for the presence of the cover on the bowl and which are adapted to control the speed changer so as to match to each cover an appropriate speed of the tool (5, 6, 8).

7 Claims, 2 Drawing Sheets

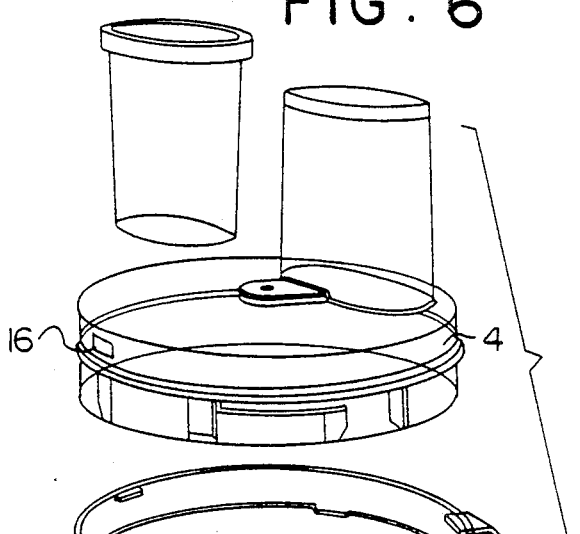
FIG. 6
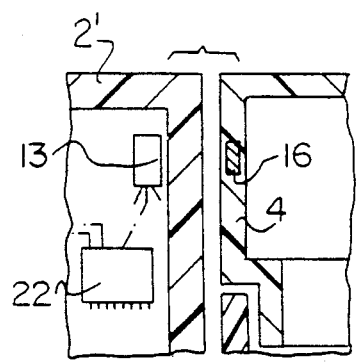
FIG. 5
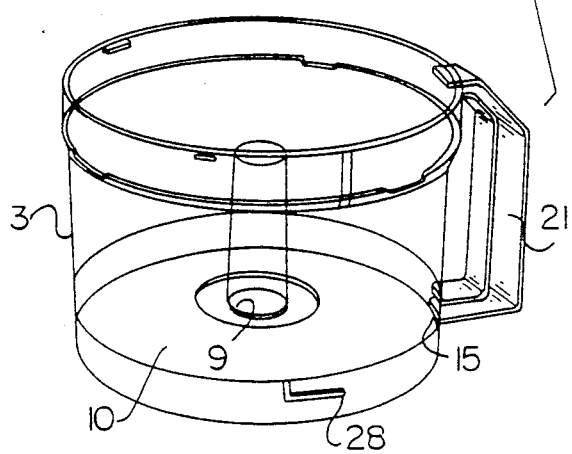
FIG. 7
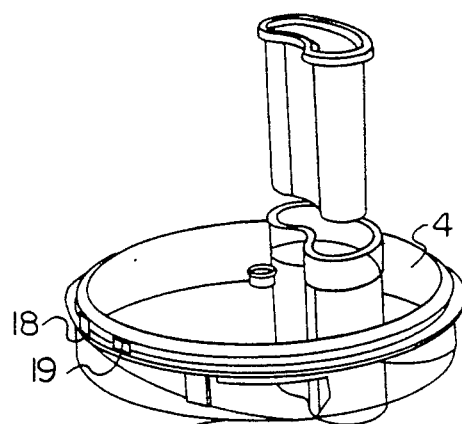
FIG. 8
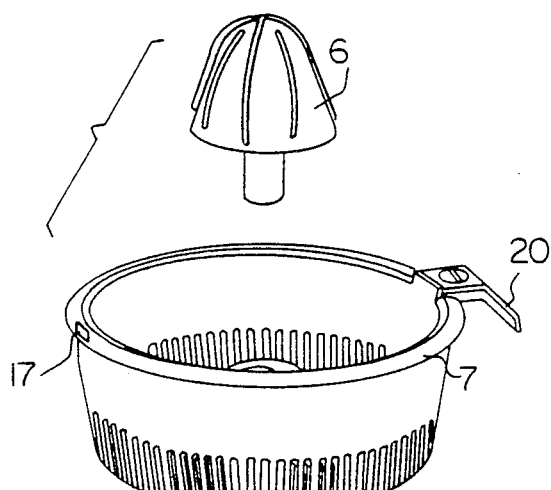
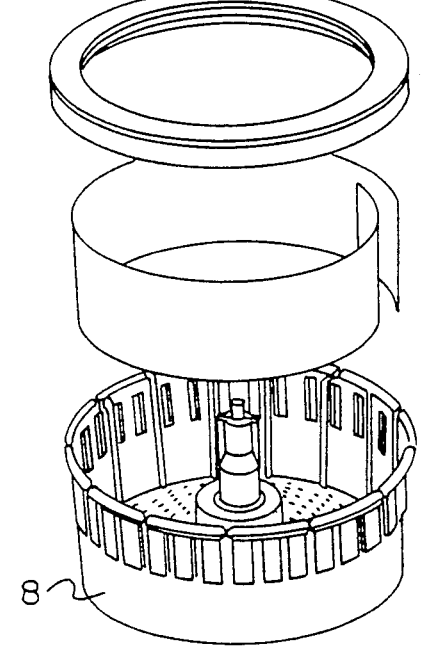

ELECTRIC KITCHEN APPLIANCE WITH MULTIPLE FUNCTIONS FOR TREATING FOODSTUFFS

The present invention relates to electric kitchen appliances with multiple functions for the treatment of foodstuffs and comprises a casing having a region forming a base adapted to receive various accessories comprising a bowl provided with a cover, and in which a working tool turns which can for example be a slicer, a vegetable cutter, a fruit centrifuge and which is driven through a hole provided in the bottom of the bowl by the output shaft of a motor assembly.

The invention relates more particularly to electric kitchen appliances which comprise an electrical apparatus for controlling the power supplied to the motor comprising detection means for the presence of the cover on the bowl and adapted to impart to the apparatus in an active condition permitting operation of the motor when the cover is in its correct closure position on the bowl, as well as a speed regulator adapted to change the speed of the output shaft as a function of the tool used.

Known apparatus of this type, on the one hand, is not completely safe, because a child can, in the absence of the bowl on the base, operate the apparatus by means of the cover alone, and on the other hand, the user must, each time the accessory is changed, try to correctly adjust the speed to perform the desired function.

The invention has for its object to overcome these drawbacks.

According to the invention, the electrical device for controlling power supply to the motor comprises also means for detecting the presence and correct positioning of the bowl on the base, as well as means for identifying the different covers which are associated with the means for detecting the presence of the cover on the bowl and which are adapted to control the speed change so as to provide for each cover a speed appropriate to the tool.

Thanks to these new detection means for the bowl and the identification of the accessories, it will be understood that absolute safety of use is achieved, as well as an automatic operation of the apparatus.

The characteristics and advantages of the invention will appear from the following description, by way of example, with reference to the accompanying drawings, in which:

FIG. 5 is a partial vertical cross section on an enlarged scale of the housing and of a cover showing the arrangement of the means for detecting the presence and for identifying the cover on the bowl;

FIG. 6 shows in perspective on a smaller scale a bowl and an accessory cover according to the invention;

FIG. 7 shows a citrus juicer accessory according to the invention;

FIG. 8 shows a fruit centrifuge accessory according to the invention.

Figure 1:
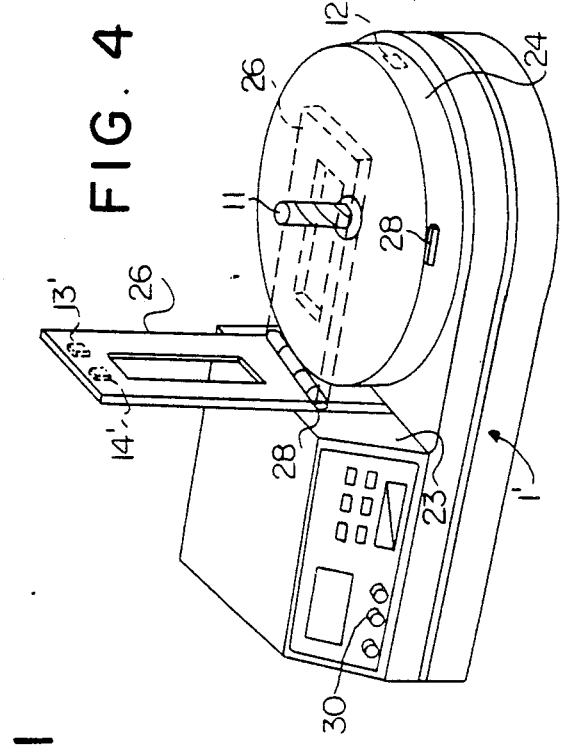
FIG. 1 is a perspective view of an electric kitchen appliance according to the invention and comprising a lateral projection and a base for receiving an accessory represented in phantom lines.

As shown in FIG. 1, the electric kitchen appliance of multiple functions for the treatment of foodstuffs comprises a casing 1 having the general form of an L constituted by a base 2 and a lateral projection 2' extending in height practically the whole height of the accessory.

The base 2 is adapted to receive various accessories comprising a bowl 3 having a cover 4 and in which turns a working tool which can for example be: a slicing knife 5, a vegetable cutter (not shown), a fruit juicer with a rotatable cone 6 and strainer 7 forming a cover (FIG. 7), and a fruit centrifuge with a rotatable basket 8 (FIG. 8). The working tool is driven through a hole 9 provided in the bottom 10 of the bowl by the output shaft 11 of a motor assembly (not shown) provided in the case.

The electric kitchen appliance comprises also an electric control device for current supply to the motor comprising a detection means for the presence of cover 4 on bowl 3 and adapted to impart to said device an active condition permitting operation of the motor when the cover 4 is correctly positioned to close bowl 3, as well as a speed changer (not shown) adapted to match the speed of the output shaft 11 to the function of the tool used.

According to the invention, the electrical control device for current supply to the motor comprises also a means for detection of the presence and correct positioning of the bowl 3 on the base 2, as well as means for identification of the various covers 4 which are associated with the detection means for the presence of the cover on the bowl and which are adapted to control the speed changer so as to match to each cover 4 the speed appropriate to the tool.

The detection means for the presence of the bowl and for the detection of the presence of the cover as well as the means for identifying the cover comprise, on the one hand, detectors 12, 13 and 14 provided in the casing, and on the other hand, spaced actuators 15, 16, 17, 18 and 19 provided respectively in the bowl and in the cover.

Each detector is constituted by a Hall effect element while each spaced actuator is constituted by a magnetic element such as for example a magnetized metal plate or a ferritic magnet whose flux controls the Hall effect detector.

As the bowl 3 and the cover 4 are of plastic material, the actuator or actuators 15, 16, 17, 18, 19 may be embedded in said plastic material (see FIG. 5).

So as to obtain correct operation and to avoid to the extent possible the attenuation of the magnetic flux, the detector 12 of the presence of the bowl, and the actuator 15 are provided respectively in the base 2 and in the region of the bottom 10 of the bowl 3, while the detectors 13, 14, and the corresponding presence and identification actuators 16, 17, 18 and 19 of the cover 4 are provided respectively in the projection 2' and in the cover 4 so as to be situated facing each other when the cover is brought into its correct position to close the bowl, shown schematically in FIG. 1.

So as to reduce the cost of the apparatus, the invention provides, to accomplish the above-recited functions, the use only of three Hall effect detectors, a magnet 15 on bowl 3 and one 16 or 17 or two 18 and 19 magnets on the covers 4. To take account of the low height given to the covers, the detectors 13 and 14 and magnets 16, 17, 18 and 19 associated with the covers will be angularly spaced and located substantially in the same horizontal plane.

Thus, the cover 4 of the accessory of FIG. 6 comprises a single magnet 16 which in the correct position of closure of said cover comes into facing relationship with the detector 13. The strainer cover 7 of the citrus juicer of FIG. 7 comprises also a single magnet 17 angularly offset such that, when this strainer cover 7 occupies its correct operating position corresponding to the superposition of the handles 20 of the cover 21 and of the bowl, said magnet comes into registry with receiver 14. As to the centrifugal accessory of FIG. 8, the cover 4 comprises two magnets 18 and 19 spaced and oriented respectively with the same angular relationship as magnets 16 and 17.

As a result, to obtain both the detection of the presence of the bowl and of the covers, as well as the identification of said covers, the detectors are connected to an electronic device for treatment of the signals 22 comprising a multiplexer stage with three inputs and whose outputs are connected to a numerical potentiometer, itself connected to an integrated circuit whose output signals will trigger or not the active condition of the control device for the supply of current to the motor as well as the control of the speed changer. This speed changer comprises in known fashion a TRIAC mounted in series with the motor and whose trigger receives the control signals emitted by said integrated circuit.

Figure 4:
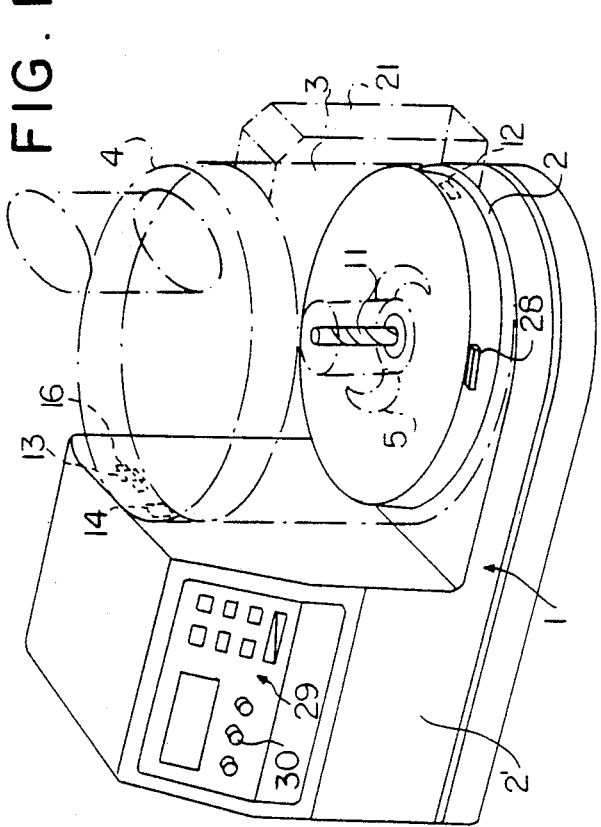
FIG. 4 is a perspective view of a modification of the apparatus of FIG. 2 in which the movable panel is swingable onto the base.
Figure 3:
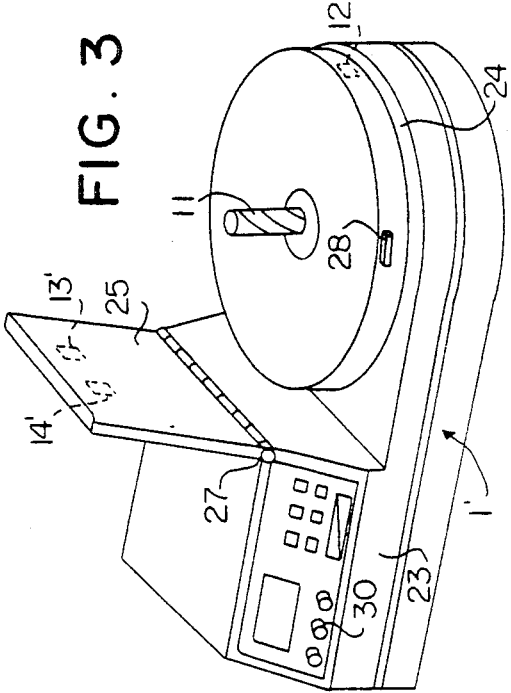
FIG. 3 is a view similar to FIG. 2 but with the movable panel raised in the operative position.
Figure 2:
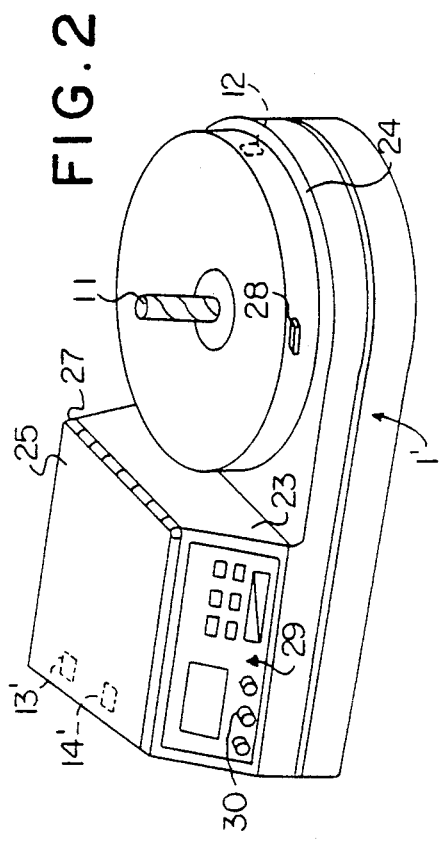
FIG. 2 is a perspective view of a modification of the electric kitchen apparatus according to the invention and comprising a small projection provided with a movable panel shown in the position folded down on the projection.

According to the modifications shown in FIGS. 2, 3 and 4, the casing 1' has a small projection 23 situated to one side of the base 24, provided with movable panel 25 or 26 mounted swingably about a horizontal axle 27 or 28 provided on the lateral surface of said projection facing the base, the detectors for the presence and identification of the cover 13', 14' being provided on said panel 25 or 26 in a region such that when the panel is upright (FIGS. 3 and 4) said detectors are situated facing the actuator or actuators 16, 17, 18 and 19 of the cover of the bowl. For the storage position, the panels 25 and 26 are swung down respectively onto the projection 23 and onto the base 24.

There will hereafter be described the operation of the device with various accessories.

In the case of use of the accessory of FIG. 6 provided for example with a knife 5, the bowl 3 is placed on base 2 and brought to its correct position, determined by the mutual indexing means 28, so as to locate the magnet 15 facing the detector 12. Then the cover 4 is positioned on the bowl 3 and brought, for example by means of a rotative gripping device of the bayonet type, to its correct closure position such that the magnet 16 will be facing detector 13. The signals then emitted by the detector 13 are treated by the electronic device 22 so as to impart the active condition to the control device for current supply to the motor and to adjust the speed changer to a valve appropriate to this accessory, which is to say in the case of a range of values from minimum to maximum and which can be incremented or decremented by the user by means of a control panel 29. For additional safety, the user actuates the preselected operation of the apparatus by means of a master switch 30.

In the case of using the citrus press accessory of FIG. 7, the strainer 7 forming the cover will be correctly positioned so as to bring magnet 17 facing detector 14, and the detection of the presence of the strainer and the adjustment of the speed changer to a minimum value will be achieved in the same manner as above.

In the case of use of the centrifuge accessory of FIG. 8, it will be understood that because the cover carries two magnets 18 and 19, the two receivers 13 and 14 are influenced and there is obtained, thanks to the multiplexer, also the detection of the presence of the cover and the automatic adjustment of the speed changer to a maximum speed.

What is claimed is:

1. In an electric kitchen appliance with multiple functions for the treatment of foodstuffs, comprising a casing (1,1') of which a portion forming a base (2,2') receives various accessories including a bowl (3) having a cover (4) and in which turns a working tool (5, 6, 8) which is driven, through a hole (9) provided in the bottom (10) of the bowl, by an output shaft (11) of a motor assembly, an electrical control device for current supply to the motor comprising detection means for the presence of the cover (4) on the bowl (3) and adapted to impart to said device an active condition permitting operation of the motor when the cover is brought to a correct position closing the bowl, and a speed changer adapted to set the speed of the output shaft to be appropriate to the tool used; the improvement wherein the electrical device for controlling current supply to the motor comprises also means for the detection of the presence and of the correct positioning of the bowl (3) on the base (2, 2'), and means for identifying various different covers (4) which is associated with the means for the detection of the presence of the cover on the bowl so as to control the speed changer to match to each cover (4) an appropriate speed of the corresponding tool (5, 6, 8).

2. Electric kitchen appliance according to claim 1, wherein the detection means for the presence of the bowl (3) and for the detection of the presence of the cover (4) as well as the identification means of the cover (4) comprise, on the one hand, receivers (12, 13, 14) provided in the casing, and on the other hand, spaced actuators (15-16, 17, 18, 19) provided in the bowl (3) and in the cover (4).

3. Electric kitchen appliance according to claim 2, wherein each receiver (12, 13, 14) is constituted by a Hall effect element, while each spaced actuator (15-16, 17, 18, 19) is constituted by a magnetic element.

4. Electric kitchen appliance according to claim 3, wherein the housing (1) having the general shape of an L constituted by the base (2) and a lateral projection (2') extending over substantially all the height of an accessory, the receiver (12) of the presence of the bowl (3), and the corresponding actuator (15) are provided respectively in the base (2) and in the bottom region (10) of the bowl, while at least one receiver (13, 14) and the corresponding actuator of the presence and identification (16, 17, 18, 19) of the cover (4) are provided respectively in the projection (2') and in the cover (4) so as to be located facing each other when the cover (4) is brought to its correct position closing the bowl (3).

5. Electric kitchen appliance according to claim 3, wherein the casing (1') having a small projection (23) situated laterally of the base (24), provided with a movable panel (25-26) swingably mounted about a horizontal axle (27-28) provided on the lateral surface of the small projection turned toward the base, said at least one receiver of the presence and identification (13',14') of the cover (4) being provided on said panel in a region such that when the panel is upright, said at least one receiver are located facing the actuator (16, 17, 18, 19) of the cover of the bowl.

6. Electric kitchen appliance according to claim 3, wherein the bowl (3) and the cover (4) being of plastic material, the actuator (15-16, 17, 18, 19) are embedded in said plastic material.

7. Electric kitchen appliance according to claim 3, wherein the Hall effect receiver (12-13, 14) are connected to an electronic device (22) for treatment of signals comprising a multiplexer stage whose outputs are connected to a numerical potentiometer, itself connected to an integrated circuit of which the output signals trigger or not the active condition of the control device for the current supply to the motor, as well as the control of the speed changer.

* * * * *